US006221501B1

(12) United States Patent
Blotzer et al.

(10) Patent No.: US 6,221,501 B1
(45) Date of Patent: Apr. 24, 2001

(54) STEEL WITH ELECTRICALLY INSULATING HEMATITE LAYER

(75) Inventors: Richard J. Blotzer, Parma; Jeffrey P. Anderson; Barry A. Lauer, both of Macedonia, all of OH (US)

(73) Assignee: LTV Steel Company, Inc., Cleveland, OH (US)

( * ) Notice: Subject to any disclaimer, the term of this patent is extended or adjusted under 35 U.S.C. 154(b) by 0 days.

(21) Appl. No.: 09/376,121

(22) Filed: Aug. 17, 1999

(51) Int. Cl.[7] .............................. B32B 15/04; H01F 1/04

(52) U.S. Cl. ...................... 428/472.2; 148/112; 148/113; 148/208; 148/217; 148/287; 148/307; 148/901; 427/104; 427/419.2; 428/623; 428/629; 428/638; 428/682; 428/683; 428/687; 428/928

(58) Field of Search ................................ 428/472.2, 682, 428/683, 623, 629, 638, 928, 687; 427/104, 419.2; 148/112, 208, 217, 287, 307, 901, 113

(56) References Cited

U.S. PATENT DOCUMENTS

| | | | | |
|---|---|---|---|---|
| 3,201,294 | * | 8/1965 | Hawkins et al. | 148/113 |
| 3,699,726 | | 10/1972 | Turner et al. . | |
| 3,883,147 | | 5/1975 | Troy et al. . | |
| 3,958,918 | * | 5/1976 | Henricks | 148/113 |
| 4,110,512 | | 8/1978 | Roy et al. . | |
| 4,115,106 | | 9/1978 | Snavely et al. . | |
| 4,322,254 | | 3/1982 | Van Til et al. . | |
| 4,496,399 | * | 1/1985 | Haselkorn | 148/113 |
| 4,828,790 | | 5/1989 | Honda et al. . | |
| 5,037,593 | | 8/1991 | Okuyama et al. . | |
| 5,112,403 | | 5/1992 | Okura et al. . | |
| 5,133,805 | | 7/1992 | Kurata et al. . | |
| 5,143,548 | | 9/1992 | Okura et al. . | |
| 5,205,911 | | 4/1993 | Kawolics et al. . | |
| 5,413,700 | | 5/1995 | Heyse et al. . | |
| 5,593,571 | | 1/1997 | Heyse et al. . | |

OTHER PUBLICATIONS

B.A. Lauer and R.J. Blotzer, *Effects of SRA Atmosphere Compositions on Cold Rolled Electrical Steels*, LTV Steel, *13th Annual Conference on Properties and Applications of Magnetic Materials*, Illinois Institute of Technology, Chicago, IL, May 17, 1994.

D.R. Gaskell, "Introduction to Metallurgical Thermodynamics," 2nd Ed., p. 490, (1981). (Ellingham Phase Diagram).

* cited by examiner

*Primary Examiner*—Deborah Jones
*Assistant Examiner*—Robert R. Koehler
(74) *Attorney, Agent, or Firm*—Watts Hoffmann Fisher & Heinke

(57) ABSTRACT

The present invention is directed to a method of forming an electrically insulating layer on a steel article such as a stack of electrical steel laminations or an individual, unstacked electrical steel lamination, comprising exposing the article to an oxidation atmosphere, and to a temperature (such as at least about 800° F.) for a time sufficient to form on the article an electrically insulating layer comprising hematite. The hematite layer is effective to provide the article with a surface resistivity characterized by an F-amp value of not greater than about 0.85 at a test pressure of 50 psi and a transfer surface roughness of about 10 micro inches (Ra). Also featured is a steel article having the electrically insulating layer formed thereon.

30 Claims, 6 Drawing Sheets

STEEL WITH ELECTRICALLY INSULATING HEMATITE LAYER

FIELD OF THE INVENTION

The invention is directed to the field of electrically insulating material on steel strip or on laminations punched from the strip, to reduce magnetic losses when the laminations are used in electrical devices.

BACKGROUND OF THE INVENTION

Oxides are formed on steel every day, both intentionally and inadvertently. In the case of electrical steel, for example, semi-processed steel is punched into suitable shapes, and the resultant laminations are stacked under substantial pressure due to the weight of the laminations, and subjected to a final anneal. The purpose of the final anneal is to relieve stress and grow grains and/or to decarburize the steel if necessary. Such annealing typically results in some incidental oxide formation on the surface of the laminations. The oxides that are formed may include a mixture of oxides of iron, including magnetite, hematite and wustite. Typical annealing conditions that produce such incidental oxides do not result in a surface resistivity of the laminations above that of conventional steam bluing methods.

Oxide layers and coatings have been formed on or applied to electrical steel laminations or strip in an attempt to provide the laminations with electrically insulating characteristics. Under conditions of alternating magnetization, electrical units such as motors and transformers that are formed from the laminations, are subject to certain power losses. The component of the loss that is attributable to the core of the unit is known as core loss. One component of core loss is eddy current loss, which is reduced by forming the core with laminations rather than as a solid mass. The laminations must be sufficiently insulated from one another to effectively reduce eddy current loss. Users of semi-processed electrical steel often apply an insulating coating to the strip before lamination punching. However, this process is costly and the coatings may lose their insulating ability after annealing.

An oxide layer of magnetite may be intentionally formed on the surfaces of the laminations during the final stage of the anneal by a process known as steam bluing in which the laminations are subjected to steam. This approach forms a layer of predominantly magnetite on the laminations that typically has a surface resistivity characterized by a Franklin amp (F-amp) value above 0.90, where 1.0 F-amp is a dead short condition.

One atmosphere that is typically used during annealing is known as a DX atmosphere or EXOGAS, which is formed of partially combusted fuel gas. In particular, natural gas (i.e., methane) is burned in air, which lacks sufficient oxygen for complete combustion. The resultant DX gas produced by this incomplete combustion comprises the following gases: $CO$, $CO_2$, $H_2$, water vapor, $N_2$, $O_2$ and unburned methane. An HNX atmosphere is another atmosphere used in annealing, though less extensively than the DX atmosphere. The HNX atmosphere includes $H_2$ and $N_2$ gases in major amounts with optional added water vapor.

The amount of water vapor present in the annealing furnace atmosphere is described in terms of dew point- the temperature at which water vapor in the furnace condenses. In the DX atmosphere the presence of some amount of water vapor is virtually unavoidable. In contrast, in the HNX atmosphere water vapor may be intentionally added. Regardless of the amount of water vapor that is intended in the annealing furnace, some water vapor is inevitably present. Water vapor may be present because, in the case of decarburizing, a higher dew point is desirable, because the annealing furnace is old and no longer effectively sealed, or because seals are broken due to opening of doors and the like to admit and expel laminations into and from the furnace.

The DX atmosphere has traditionally been used to decarburize high carbon content steel. Decarburizing is enhanced by factors such as raising the dew point of the atmosphere and decreasing the amount of hydrogen gas in the case of the DX atmosphere. Although the DX atmosphere is still used today to anneal ultra low carbon content steels, it is not necessary since carbon does not need to be removed therefrom by decarburization and thus, a lower dew point could be used.

SUMMARY OF THE INVENTION

In the present invention an electrically insulating hematite layer is formed on steel laminations which offers substantial advantages compared to steam blued magnetite layers or conventional resistive coatings. The present invention offers a relatively inexpensive and convenient way to produce the insulating layer on laminations which increases the efficiency of motors, transformers and the like that are fabricated from these laminations. The surface resistivity of the steel laminations with the hematite oxide layer is greater (lower F-amp value) than that obtained in laminations having a steam blued layer of magnetite. The magnetite rich oxide layer resulting from steam bluing does not consistently provide steel laminations with a surface resistivity characterized by an F-amp value below 0.9.

In general, the present invention relates to a method in which a steel article is exposed to an oxidation atmosphere, and to a temperature (such as at least about 800° F.) for a time so as to form on the article an electrically insulating layer comprising hematite. The hematite layer is effective to provide the article with a surface resistivity characterized by an F-amp value of not greater than about 0.85 at a test pressure of 50 pounds per square inch ("psi") and a transfer surface roughness of about 10 microinches (Ra). Use of the phrase "transfer surface roughness" herein means the surface roughness of the steel laminations that has been acquired by contact between temper rolls and the steel strip. The indicated test pressure and transfer surface roughness of the article are provided for the purpose of uniformity and should not be interpreted to limit the invention in any way. The inventive oxide layer may be formed on steel articles with a transfer surface roughness other than about 10 microinches (Ra).

In a preferred embodiment, the present invention relates to a method of forming an electrically insulating oxide layer on a steel article comprising heating the article in a protective atmosphere and then cooling the article. In all embodiments of the invention the article may be an individual, unstacked lamination punched from electrical steel strip or a stack of the laminations. The article may comprise an antistick coating under the oxide layer. The article is exposed to an oxidation atmosphere and to an oxidation furnace temperature of at least about 800° F. The article is maintained at the oxidation temperature for a time sufficient to form thereon an electrically insulating oxide layer comprising hematite effective to provide the article with a surface resistivity characterized by an F-amp value not greater than about 0.85 and, preferably, not greater than 0.40, at a test pressure of 50 psi and a transfer surface roughness of about 10 microinches (Ra).

More specifically, in the inventive method the protective atmosphere is an atmosphere in which chemical reactions of the electrical steel are prevented except for reactions involving carbon. The protective atmosphere preferably comprises HNX or DX gas. The article is exposed to the oxidation atmosphere and temperature for at least about 2 minutes, even more preferably for at least about 20 minutes. The oxidation temperature is preferably at least about 950° F. The oxidation atmosphere is preferably pressurized sufficiently to establish flow of the atmosphere (such as air blown from fans or oxygen released under pressure from tanks).

The dew point of the protective atmosphere may be adjusted so as to promote magnetic properties. When decarburization is desired in the protective atmosphere, the dew point is preferably at least 50° F. and, more specifically, in the range of 50 to 60° F. The protective atmosphere may have a dew point of at least 50° F. even if decarburization is not needed, such as use of a DX atmosphere on ultra low carbon steel. However, the dew point is preferably not greater than 40° F. in a protective atmosphere comprising HNX gas when decarburization is not employed. It is difficult to reduce the dew point of a DX atmosphere much below 50° F.

The present method may be carried out in separate chambers or in the same chamber of an annealing furnace or facility. In one aspect of the invention, the protective atmosphere is applied to the article in a first chamber and then the oxidation atmosphere is applied to the article in a second chamber. In another aspect of the invention, the protective atmosphere is applied to the article in a chamber, the protective atmosphere is then replaced in the chamber with the oxidation atmosphere, and the oxidation atmosphere is then applied to the article in that chamber.

Another embodiment of the present invention is directed to a steel article comprising an electrically insulating oxide layer formed thereon that is firmly chemically bonded to the article so as to avoid flaking. The oxide layer comprises hematite effective to provide the article with a surface resistivity characterized by an F-amp value not greater than about 0.85 and, more preferably, not greater than 0.40, at a test pressure of 50 psi and a transfer surface roughness that is about 10 microinches (Ra).

The steel article may employ a suitable electrical steel composition such as a composition comprising (% by weight): up to 0.04 C, 0.20–2.25 Si, 0.10–0.60 Al, 0.10–1.25 Mn, up to 0.02 S, up to about 0.01 N, up to 0.07 Sb, up to 0.12 Sn, up to 0.1 P, and the balance being substantially iron.

The present invention advantageously enables steel articles, in particular electrical steel laminations, to have electrically insulating characteristics, using a process that is economical and avoids the need for expensive and sometimes unreliable antistick insulative coatings. The inventive hematite layer is formed at the time of the already existing final annealing practice for treating electrical steel. This practice may be modified to employ the oxidation stage in which the laminations are maintained in the oxidation atmosphere for a suitable time to form the hematite layer. This presents customers of electrical steel with a substantial savings and/or superior product compared to products using steam blued layers or insulating antistick coatings. The inventive hematite layer is formed by an annealing practice that does not require use of new or expensive protective atmospheres, but rather permits the use of current protective atmospheres such as DX and HNX atmospheres. The duration of the final anneal according to the present invention is not overly burdensome to conventional annealing facilities and practices. In addition, the present invention does not prevent one from carrying out decarburization. Also permitted is some variation in dew point selection so that desired magnetic properties for a particular grade of steel may be achieved, while maximizing the surface resistivity of the oxide layer. It is believed that current annealing furnaces may be adapted to employ the present invention while achieving suitable magnetic properties and achieving satisfactory or improved efficiency of motors, transformers and the like.

Other objects and a fuller understanding of the invention will be had from the accompanying drawings and detailed description that follows.

DETAILED DESCRIPTION OF PREFERRED EMBODIMENTS

Figure 1:
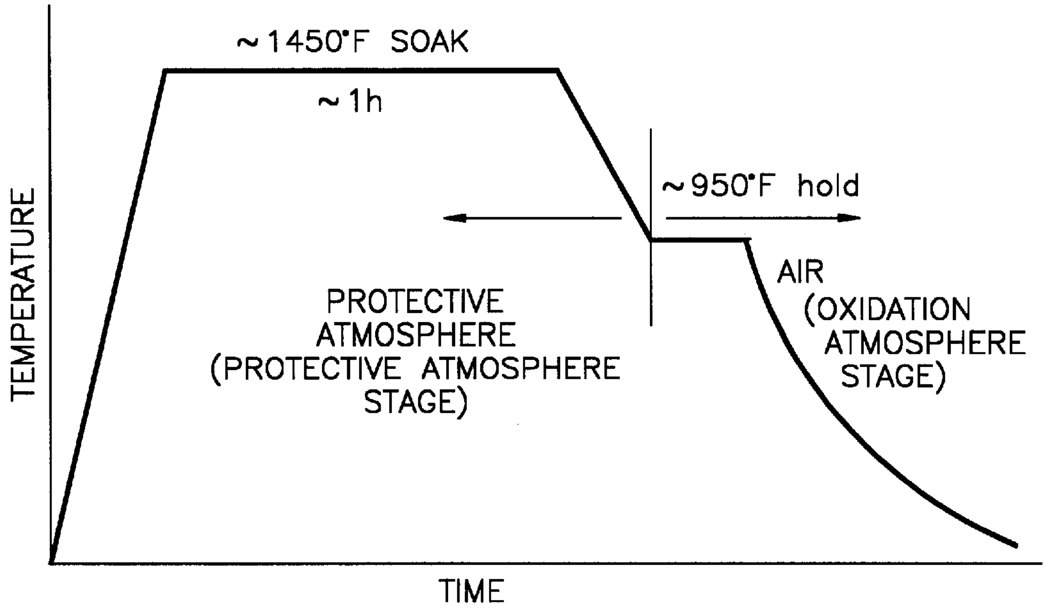
FIG. 1 is a preferred heating schedule for forming a hematite layer on a steel article in accordance with the present invention.

Referring now to the drawings, the present invention includes a method of forming an electrically insulating oxide layer on steel articles such as stacked steel laminations or, preferably, individual, separated steel laminations with exposure to the atmosphere on all sides and little or no compressive interlamellar forces applied. The method comprises a protective atmosphere stage in which the laminations are heated in a protective atmosphere and temperature sufficient for annealing and/or decarburization to occur. The laminations are cooled while in the protective atmosphere and then subjected to an oxidation stage including an oxidation atmosphere, and held at an oxidation furnace temperature of at least about 800° F. Formed on the laminations is an electrically insulating layer comprising hematite effective to provide each of the laminations with a surface resistivity characterized by an F-amp value not greater than about 0.85. In practice, all exposed sides of individual laminations, as well as a significant number of the laminations of a stack, are expected to exhibit improved surface resistivity as a result of the inventive method.

Various electrical steel compositions may be suitable for forming the hematite layer thereon. In general, a suitable electrical steel composition is characterized by up to 2.25% silicon by weight and preferably, 0.20–2.25% silicon by weight. Such a composition includes up to 0.04% carbon and, preferably, up to 0.01% carbon. In particular, the composition may employ ultra-low carbon (i.e., carbon in an amount not greater than 50 parts per million). More specifically, the composition comprises (% by weight): up to 0.04 carbon (C), 0.20–2.25 silicon (Si), 0.10–0.60 aluminum (Al), 0.10–1.25 manganese (Mn), up to 0.02 sulphur (S), up to about 0.01 nitrogen (N), up to 0.07 antimony (Sb), up to 0.12 tin (Sn), up to 0.1 phosphorus (P), and the balance being substantially iron. In particular, the composition may comprise (% by weight): up to 0.01 C, 0.20–2.25 Si, 0.10–0.45 Al, 0.10–1.0 Mn, up to 0.015 S, up to 0.006 N, up to 0.07 Sb, up to 0.12 Sn, 0.005–0.1 P, more preferably 0.005–0.05 P, and the balance being substantially iron.

One electrical steel composition suitable for use in the present invention is known as LTV Steel Type 9-T and has the following composition (% by weight): 0.003 C, 0.51 Mn, 0.011 P, 1.16 Si, 0.32 Al, 0.005 S and 0.033 Sb, and the balance being substantially iron. Another suitable electrical steel composition is known as LTV Steel Type 2 ULC and has the following composition (% by weight): 0.010 C, 0.500 Mn, 0.040 P, 0.250 Si, 0.110 Al, 0.005 S, 0.015 Sb and the balance being substantially iron.

One general process of making suitable electrical steel strip for use in the present invention includes hot rolling a slab of electrical steel into a strip at either a ferrite or an austenite hot roll finishing temperature. The strip is then coiled and pickled. The strip may be subjected to a hot band or "pickle band" anneal, and is then cold rolled, batch annealed and temper rolled. The strip would then possibly be coated with an insulative material that prevents sticking. It may be possible to form the electrically insulating hematite layer on the antistick coating that is present on laminations formed from the strip. Motor or transformer shapes are punched out of the strip, and may be arranged and stacked as laminations. Preferably, the hematite layer is formed directly on the laminations without an antistick coating being applied. Either individual, unstacked laminations or the stacked laminations, are then subjected to a final anneal in accordance with the present invention. For specific features of suitable methods of making electrical steel, refer to U.S. Pat. No. RE 35,967 to Lauer et. al., entitled "Process of Making Electrical Steels;" U.S. patent application Ser. No. 09/105,802 to Anderson and Lauer, entitled "Electrical Steel with Improved Magnetic Properties in the Rolling Direction;" and U.S. patent application Ser. No. 09/038,172, entitled "Process of Making Electrical Steels Having Good Cleanliness and Magnetic Properties," all of which are incorporated herein by reference in their entireties.

Typical final annealing heating schedules may be modified so as to carry out the inventive method. In the inventive method, after punching, the laminations are subjected to a burnoff stage of the anneal in a protective atmosphere at a temperature ranging from room temperature to 900° F. Lubricants on the laminations are believed to be removed during the burnoff stage, thereby exposing the steel surface directly to the atmosphere. The laminations are then heated, for example, as shown in FIG. 1, at a soak temperature in the protective atmosphere for a time sufficient to achieve favorable magnetic properties under conditions known to those skilled in the art. The protective atmosphere may be a DX atmosphere or HNX atmosphere, for example. Either a high or low dew point may be used, a high dew point (e.g., at least 50° F.) being desirable for decarburizing. The furnace temperature in the protective atmosphere stage and the soak time may be any used by those skilled in the art such as a temperature of about 1450° F. and soak time of about 1 hour. The temperature during the protective atmosphere stage is not believed to significantly affect formation of the hematite layer.

An important feature of the present method is the oxidation stage. After the soak in the protective atmosphere, the laminations are cooled in the protective atmosphere to the oxidation temperature of at least about 800° F. Once at the oxidation temperature, the oxidation stage begins and the oxidation atmosphere is applied to the laminations. The oxidation temperature is preferably at least about 950° F. The laminations are preferably maintained isothermally during the oxidation stage. However, the results of the present invention may be achieved so long as the temperature is at least about 800° F. in the furnace during the oxidation stage, even if not isothermal. That is, maintaining the oxidation temperature at at least about 800° F., even if the temperature varies above this point, is also believed to produce the inventive hematite layer on the laminations. The laminations are subjected to a furnace temperature that is prevented from falling below about 800° F. and, more preferably, to a furnace temperature that is prevented from falling below about 950° F. for at least 20 minutes.

Increasing the temperature during the oxidation stage desirably increases the surface resistivity of the laminations. However, there is an upper limit to oxidation temperature at which the hematite layer tends to flake (e.g., at about 1050–1100° F.). The upper oxidation temperature should be less than the temperature at which flaking is a concern. Another practical limitation upon the upper oxidation temperature is due to the fact that most annealers have limited cooling capacity. Therefore, the temperature should preferably not be so high that the laminations cannot be manageably cooled. It is desirable to adapt the inventive method to accommodate, to a reasonable extent, the capabilities of existing annealing facilities. Nevertheless, it is expected that modifications to current annealing facilities may be desirable in practicing the present invention such as increasing cooling capacity, adding or modifying equipment for filling and purging the protective and oxidation atmospheres, and possibly using different temperature control so as to control the temperature during the oxidation atmosphere stage.

During the oxidation atmosphere stage, the laminations are subjected to the oxidation atmosphere. The oxidation atmosphere may comprise substantially pure oxygen gas, air, or other gas mixtures containing oxygen gas. The oxidation atmosphere is preferably pressurized such as air blown by fans or compressed oxygen gas released from tanks. The pressure that is used is any suitable pressure as determined by flow rate. The method may use pressurized or compressed air or other gas having a pressure sufficient to establish flow of the oxidizing atmosphere. The pressure need not be much greater than atmospheric, for example, 0.05 inches water column ("wc"), to produce the inventive results while preventing leaks of external oxygen gas into the furnace which would result in a potentially explosive condition.

The present method is not believed to be significantly dependent upon a rapid flow rate of the oxidation atmosphere. This is advantageous in that rapid flow rates may inadvertently cool the laminations before hematite is able to form. However, a minimum flow rate may be desirable for effective hematite formation. There should be a balance between the applied air flow and the need to maintain the temperature during the oxidation stage at the minimum temperature of about 800° F. or above. The air flow such as that applied by fans, lowers the temperature of the laminations. To the extent that a flow of gas is applied, it must be applied so that the temperature does not drop below the minimum specified oxidation temperature.

The laminations may be subjected to the oxidation atmosphere in the same or in a different chamber than that used for the protective atmosphere stage. When the protective atmosphere and oxidation stages are carried out in the same chamber, the laminations are subjected to the protective atmosphere in the chamber, the protective atmosphere is removed, and the oxidation atmosphere is filled into the same chamber. The protective atmosphere may be evacuated with the oxidation atmosphere or with some other gas or device. The laminations are then subjected to the oxidation atmosphere. Alternatively, when using separate chambers, the laminations may be subjected to the protective atmosphere in a first chamber, and then the laminations are passed into a second chamber and subjected to the oxidation atmosphere. A purging chamber may be located between the first and second chambers to prevent intermingling of the protective and oxidation atmospheres.

Figure 5:
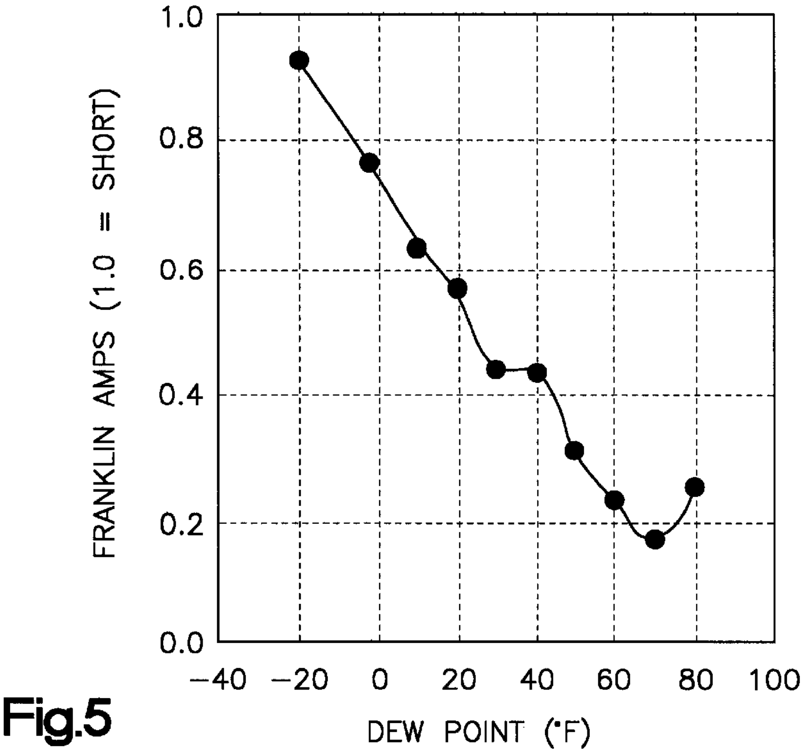
FIG. 5 is a graph of surface resistivity versus dew point for steel laminations having an oxide layer formed thereon.

Less water vapor is present in the protective atmosphere at lower dew points. In the present invention, surface resistivity increases with increasing dew points of the protective atmosphere. One suitable HNX atmosphere comprises the following gases (in volume %): at least 4% $H_2$, more specifically 18% $H_2$, water vapor as determined by the specified dew point, and the balance being substantially nitrogen gas. In the case in which the HNX atmosphere is used without decarburizing, the dew point is preferably not greater than 40° F., with satisfactory lower dew points being those which provide the laminations with a surface resistivity characterized by an F-amp value not greater than about 0.85 as shown in FIG. 5. Even though increases in dew point tend to increase the resistivity of the hematite layer, there is a practical upper limit to dew point. Dew points above 40° F. may degrade magnetic properties (e.g., lower permeability or raise core loss). The present invention is also suitable for using the HNX atmosphere at higher dew points to decarburize the steel laminations. Since water vapor is selectively added in the HNX atmosphere, there is no upper limit to the dew point of the HNX atmosphere, other than that which provides good magnetic properties. For decarburizing, the HNX atmosphere preferably employs a dew point ranging from 50 to 60° F., a dew point of 55° F. being most preferred.

The DX protective atmosphere used in the present invention is produced by a DX generator which, as known in the art, subjects a mixture of natural gas (methane) and air to incomplete combustion. The DX atmosphere has an air/natural gas ratio in a range of 5–8. The generated DX atmosphere includes the following gases: $CO_2$, CO, $H_2$, $N_2$, uncombusted methane and water vapor. One suitable DX atmosphere may contain the following gases (% by volume): 7% CO, 7.5% $CO_2$, 7.4% $H_2$, water vapor as determined by a dew point of about 62° F., about 0.25% methane, with the balance being $N_2$. From the DX generator, the generated DX gas is passed through a chiller to lower dew point to a range of 50 to 60° F. This atmosphere is sufficient for decarburization and for avoiding oxidation. In all embodiments of the invention, in the protective atmosphere stage the annealing furnace is operated so as to apply the protective atmosphere with due regard for concerns of decarburizing, annealing without decarburizing, and avoiding oxidation.

The present method produces a layer comprised substantially of hematite rather than the predominantly magnetite formed by steam bluing. Upon analyzing the hematite layer that is formed in accordance with a preferred embodiment of the present invention, the hematite is so prevalent that there may not be X-ray diffraction peaks that indicate the presence of magnetite. In this case, while not wanting to be bound by theory, it is believed that to the extent that any magnetite at all is present in the inventive hematite layer, it is preferably present in an amount less than about 2% by volume in view of the lack of magnetite peaks in the X-ray diffraction pattern.

The inventive insulating oxide layer that is formed, while it may contain an incidental amount of magnetite, is formed of hematite in an amount effective to provide the laminations with an F-amp value of not greater than about 0.85. The presence of magnetite decreases the surface resistivity of the laminations (resulting in a greater F-amp value). The inventive hematite layer preferably provides the laminations with an F-amp value ranging from 0.3 to about 0.7 and in particular, in a range from 0 to not greater than 0.40.

The surface resistivity measurements described herein are conducted by carrying out standard test method ASTM A717/A717M-95 entitled, "Surface Insulation Resistivity of Single Strip Specimens," which is incorporated herein by reference in its entirety. The surface resistivity measurement employs test conditions of a test pressure of 50 psi on smooth steel such as Type 9-T steel supplied by LTV Steel, having a transfer surface roughness of about 10 microinches (Ra). The surface resistivity (F-amp) values reported herein were based upon testing single laminations, not an entire stack, although the method may be carried out on a stack of laminations.

Figure 2:
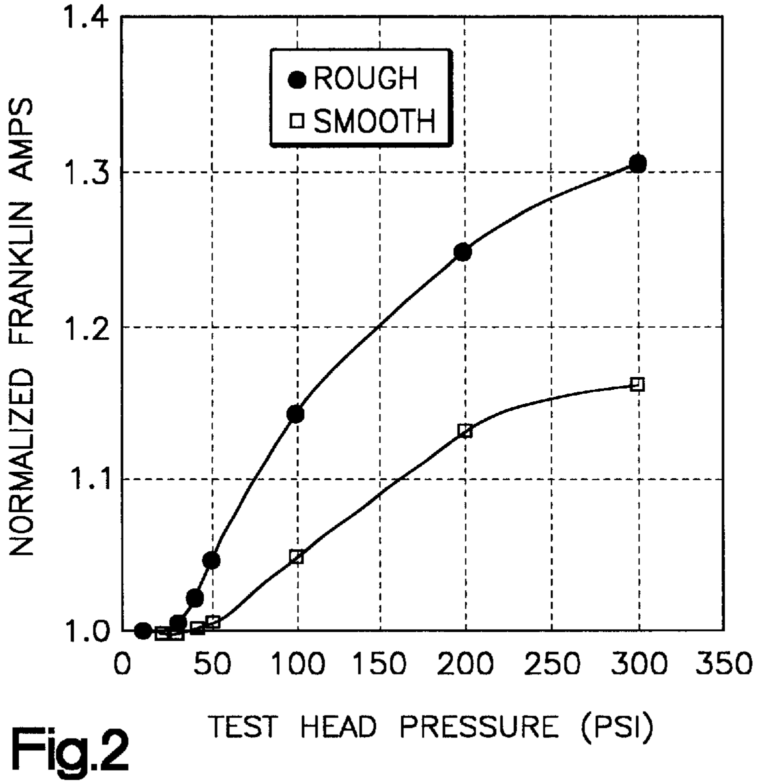
FIG. 2 is a graph showing the effect of transfer surface roughness and test head pressure upon resistivity.

As shown in FIG. 2, we have discovered that the extent of the transfer surface roughness of the laminations alters the results of the surface resistivity measurements according to standard test method ASTM A717/A717M-95. As shown in that figure, rough surfaces having a transfer surface roughness on the order of, for example, about 60 microinches (Ra), exhibited a higher F-amp value than smooth surfaces having a transfer surface roughness on the order of, for example, about 10 microinches (Ra) with increasing test pressure. FIG. 2 was prepared using laminations formed from various grades of electrical steel, with either the smooth or rough surface roughness and with the dimensions described in Example 1. The samples were subjected to an HNX atmosphere of 18% $H_2$ (by volume) with the balance being $N_2$ at a 55° F. dew point, and soaked at 1440° F. for 30 minutes. The strips were then cooled while in the HNX atmosphere to 1000° F. at which they were held isothermally for 20 minutes in an oxidation atmosphere of air at 2.0 inches water column and 26 standard cubic feet per hour.

Despite the differences between rough and smooth surface measurements, the rough and smooth surfaces are believed to have equivalent layers of hematite formed thereon that provide the rough and smooth laminations with substantially the same "actual" surface resistivity for purposes of this invention. While not wanting to be bound by theory, the rough surfaces are believed to exhibit a higher surface resistivity measurement due to surface peaks initiating cracks sooner than on the smooth laminations, which push through the coating and cause comparatively more short circuits than on the smooth laminations, as the test pressure increases. It is believed that this relationship occurs because with increasing test pressure, the insulative coating is increasingly compressed, may fracture microscopically and produce more short circuits.

The present invention is believed to form the inventive electrically insulating layer on the various electrical steel compositions described herein, as well as on steel having smooth and rough surfaces. Laminations with insulative oxide layers have a surface resistivity falling within that described herein if they have the specified F-amp values, determined under the surface resistivity test conditions described above. The present invention is not limited to use on smooth surfaces. If use of a rough lamination with an insulative hematite oxide layer is desired, to determine whether that rough lamination would have a surface resistivity value as specified herein, a smooth lamination having the same composition as the rough lamination and an insulative oxide layer formed thereon in the same manner as on the rough lamination, should be tested under the conditions described (i.e., at a test pressure of 50 psi and transfer surface roughness of about 10 microinches (Ra)). Since the hematite layers on the smooth and rough samples should be equivalent, the measurement of the oxide layer on the smooth laminations will provide an F-amp value that represents the "actual" or more representative surface resistivity of the hematite layer on the rough laminations.

During the process of forming the hematite layer according to the invention, some laminations were stacked horizontally and subjected to substantial artificially induced compressive forces to simulate the compressive forces on the laminations in a commercially annealed stack. It was observed that the hematite layer may not penetrate completely into highly compressed regions of a stack of laminations. Therefore, it is preferable to load the laminations with little or no interlamellar compressive forces. Lamination surfaces should be allowed as much exposure to the oxidation atmosphere as is practical. It may be desirable to alter the loading configuration and stack height, or to hang the laminations vertically to allow for better penetration. Such vertical hanging would relieve the compressive forces due to the weight of the laminations upon each other. However, a stack of about 640 stator laminations having two inches of back iron that was tested, exhibited penetration of the hematite layer throughout the stack and especially at the heavily compressed bottom of the stack.

The invention will now be described with reference to the following nonlimiting examples.

EXAMPLE 1

All electrical steel samples in the following examples and comparative examples were in the form of laminations or coupons and were prepared from the Type 9-T electrical steel composition, unless otherwise indicated. All samples described in the following tests were in the form of two unstacked laminations having a size of 1.125 inches by 6 inches and a thickness of about 0.018 inch with full exposure to the atmosphere. All of the graphs shown were generated by averaging the surface resistivities of the samples tested. The samples were degreased in acetone, and subjected to a burnoff stage as described earlier and then to the heating schedule similar to that shown in FIG. 1. The samples were tested in a stationary position in a laboratory electric furnace in which temperature changes were accomplished by varying the current in the furnace windings. The furnace volume was approximately 1.2 cubic feet.

After the initial ramp up in temperature, the samples were subjected to an HNX atmosphere comprising 18% $H_2$ (by volume) at a 40° F. dew point (0.835% of water by volume) with the balance being substantially $N_2$. All plots herein show the results of testing with a 40° F. dew point except for FIG. 5 in which dew point was varied, and FIG. 8. The —10.0° F. dew point in FIG. 5 represents 0.074% water vapor (by volume) and the 80° F. dew point represents 3.575% water vapor (by volume). The samples were subjected to a soak temperature during the protective atmosphere stage of about 1450° F. for about 10 minutes. The samples were cooled for about 10–15 minutes in the HNX atmosphere as shown in FIG. 1.

The laminations were then subjected to an isothermal oxidation furnace temperature of about 950° F. and held at this temperature for about 20 minutes (the oxidation stage). During this stage the samples were subjected to air at a pressure of 2.0 inches wc at a flow rate of 34 standard cubic feet per hour (scfh). Upon inspection, a hematite layer was formed on both sides of the individual laminations.

Figure 3:
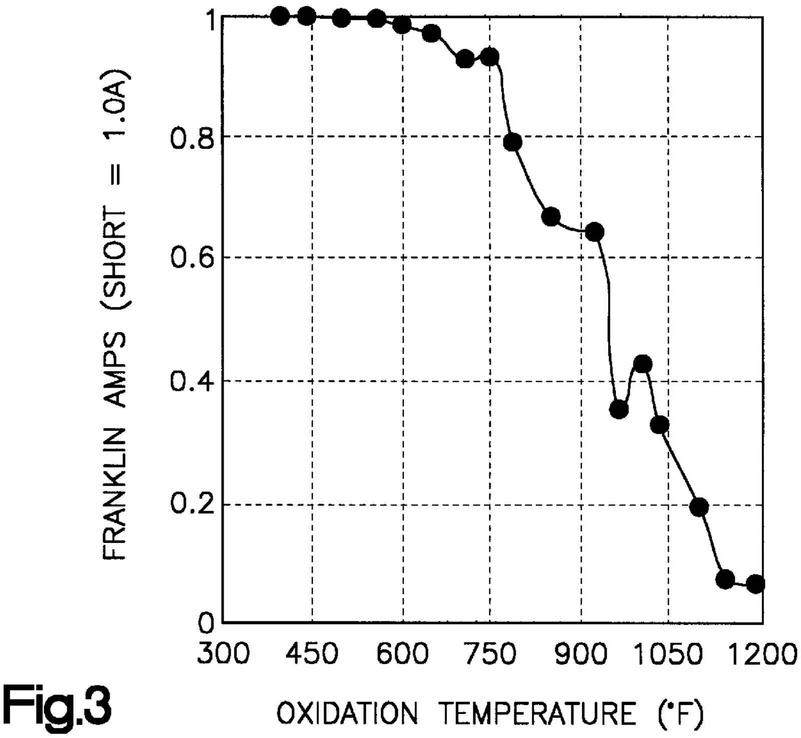
FIG. 3 is a graph of surface resistivity versus oxidation temperature for steel laminations having an oxide layer formed thereon.

FIG. 3 shows the effect of the oxidation temperature upon the surface resistivity. All of the process conditions except for oxidation temperature that were described in connection with FIG. 1 were used to produce the results shown in FIG. 3. FIG. 3 illustrates that as the oxidation temperature increases, surface resistivity increases. As discussed above, the oxidation temperature must not be so high as to cause flaking of the oxide layer and may be limited by cooling constraints in annealing facilities.

Figure 4:
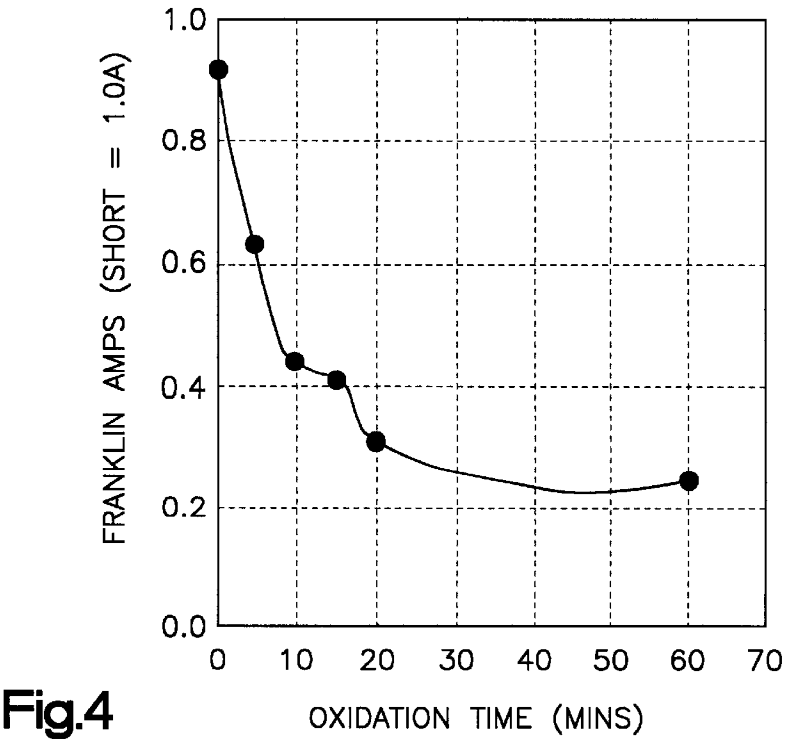
FIG. 4 is a graph of surface resistivity versus oxidation time for steel laminations having an oxide layer formed thereon.

The effect of the holding time at the oxidation temperature upon surface resistivity was investigated as shown in FIG. 4. All of the process conditions except holding time that were described in connection with FIG. 1 were used to obtain the results shown in FIG. 4. Increasing the hold time increased the surface resistivity, up to a certain point. The samples exhibited very good surface resistivity after a hold time of about 20 minutes.

The effect of dew point upon surface resistivity was examined as shown in FIG. 5. The dew point during the protective atmosphere stage was varied at a soak temperature of 1450° F. under the conditions described in connection with FIG. 1. FIG. 4 shows that an optimum dew point is about 40° F. or less. Higher dew points may be harmful to magnetic properties. Lower dew points result in lowered surface resistivity. The laminations exhibited a surface resistivity characterized by an F-amp value not greater than about 0.85 at a dew point of about −10° F. and at greater dew points. The surface resistivity was characterized by an F-amp value of less than 0.5 at a 40° F. dew point.

Figure 6:
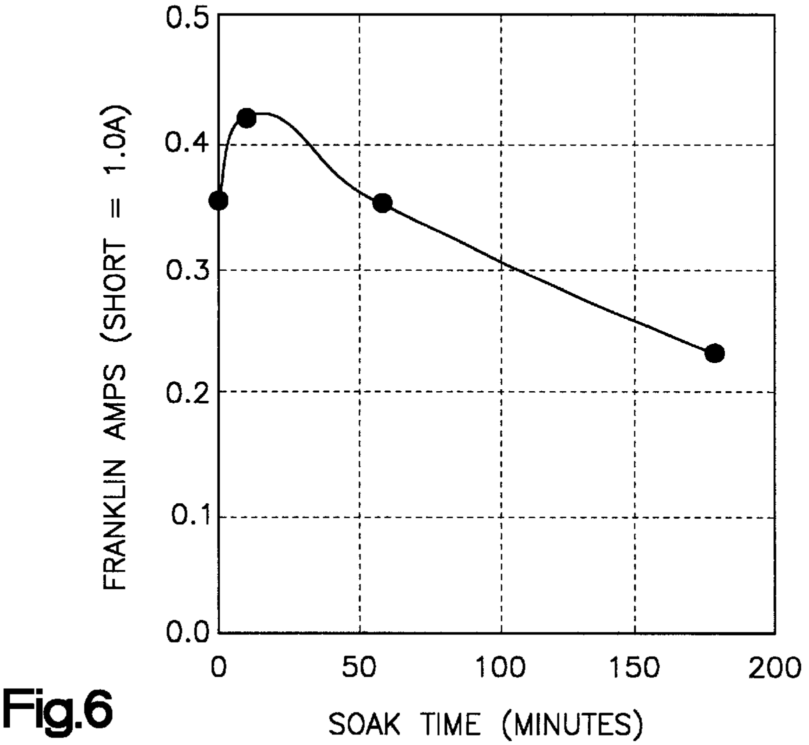
FIG. 6 is a graph of surface resistivity versus oxidation soak time for the inventive steel laminations.

The effect of protective atmosphere soak time upon surface resistivity was examined, as shown in FIG. 6. The soak times studied were 1, 10, 60 and 180 minutes. All soaks were in the HNX atmosphere described in connection with FIG. 1 at a protective atmosphere temperature of 1450° F. and a 40° F. dew point. During the oxidation stage, the samples were heated at 950° F. for 20 minutes in air at 2.0 inches wc and 34 scfh. The longer soak times in the protective atmosphere stage may afford an incremental improvement in the surface resistivity values. However, from a practical standpoint the soak time should be chosen to optimize magnetic properties by way of grain growth, strain relief and (if necessary) decarburization.

EXAMPLE 2

Figure 7:
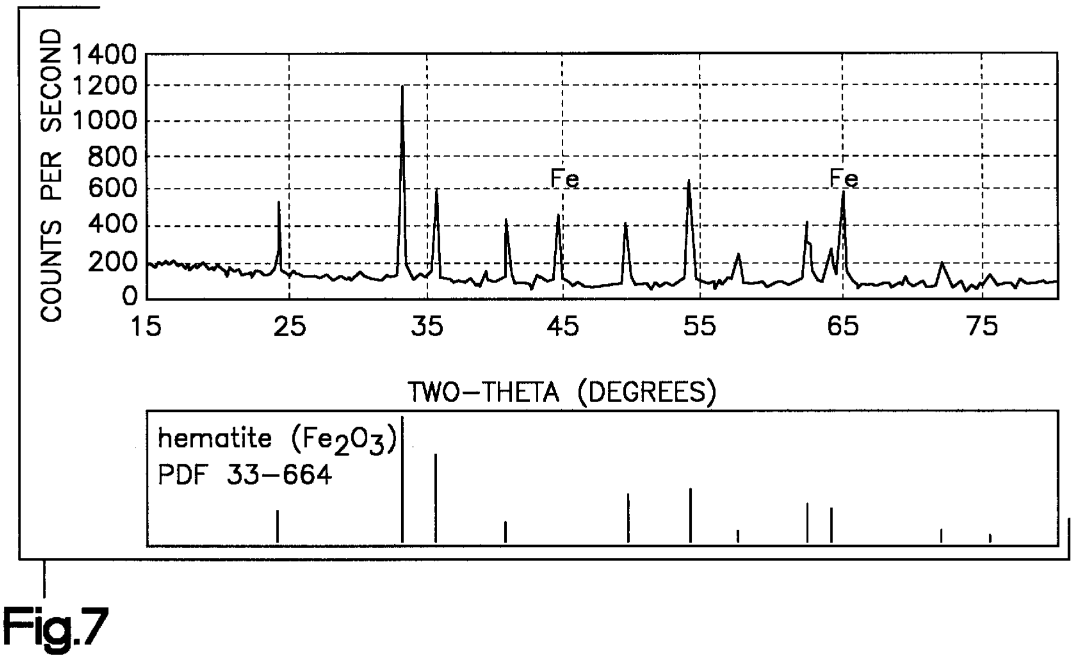
FIG. 7 is an X-ray diffraction pattern for electrical steel laminations having a resistive layer of hematite formed thereon in accordance with the present invention, along with a corresponding Powder Diffraction Reference ("PDR") card.

The samples described in Example 1 were soaked at 1450° F. for 10 minutes in the 18% $H_2$ (by volume) HNX atmosphere with a 40° F. dew point. The samples were then cooled while in the HNX atmosphere. The samples were then held at 950° F. for 20 minutes in air at 34 scfh and 2.0 inches wc. The X-Ray Diffraction ("XRD") pattern of FIG. 7 illustrates that the resulting oxide layer was fairly thick as evidenced by the relatively high counts per second. As shown by the Powder Diffraction File ("PDF") card, the oxide was almost pure hematite. This pattern consists of signals from the oxide and from the underlying steel (the "Fe" peaks). The oxide layer had a surface resistivity characterized by an F-amp value of 0.156 F-amps, which is very electrically insulating.

EXAMPLE 3

Figure 8:
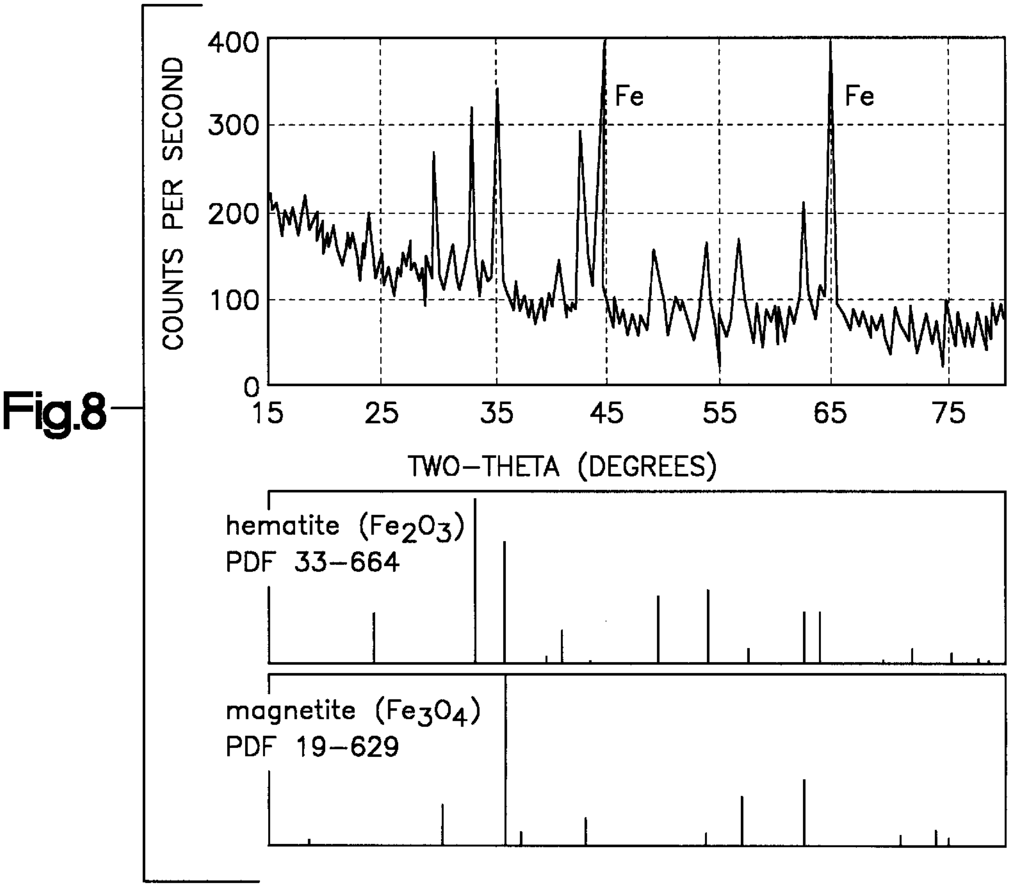
FIG. 8 is an X-ray diffraction pattern for electrical steel laminations with an oxide layer formed thereon, along with a corresponding PDR card.

Samples in the form of the laminations described in Example 1 were soaked at 1450° F. for 10 minutes in the 18% (by volume) HNX atmosphere at a 40° F. dew point. The samples were cooled while in the HNX atmosphere and were isothermally oxidized at 800° F. in flowing air at 2.0 inches wc at 34 scfh for 20 minutes. The resulting XRD pattern, which is shown in FIG. 8, illustrates that although hematite has been formed, magnetite is the dominant phase. The surface resistivity of the samples was 0.858 F-amps.

COMPARATIVE EXAMPLE 1

An oxide may be formed by using steam while holding the samples isothermally (or during slow cooling). This process was carried out by soaking the samples of Example 1 in the 18% (by volume) HNX atmosphere at a 55° F. dew point and a protective atmosphere temperature of 1450° F. for ten minutes. The samples were cooled while in the HNX atmosphere and were then held isothermally at 950° F. for 25 minutes in flowing steam. The samples had an average surface resistivity characterized by an F-amp value of about 0.994.

Figure 9:
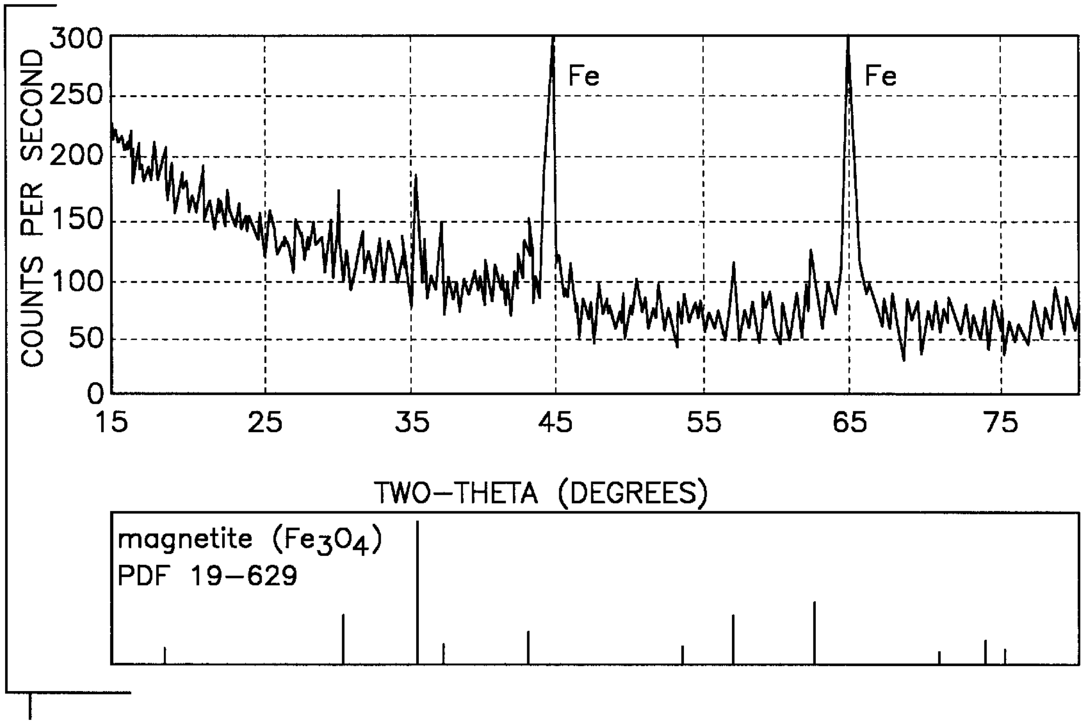
FIG. 9 is an X-ray diffraction pattern for electrical steel laminations having a layer of predominantly magnetite formed thereon by exposure to steam, along with a corresponding PDR card.

The XRD pattern from the resulting oxide is shown in FIG. 9. Its relatively weak signal (indicated by the low counts per second) suggests that the layer was quite thin. As shown by the PDF card, the oxide generated was entirely magnetite. The thin magnetite layer is not very insulating and explains the 0.994 F-amp value.

COMPARATIVE EXAMPLE 2

An experiment was carried out to illustrate the effect of the oxidation temperature upon oxide formation. Samples as described in connection with Example 1 were formed from the LTV Steel Type 2 ULC electrical steel composition.

The samples were soaked at 1450° F. for 10 minutes in the 18% $H_2$ (by volume) HNX atmosphere at a 40° F. dew point. The samples were then cooled in the HNX atmosphere to a temperature of 700° F., which is outside the oxidation temperature range of the present invention. The samples were isothermally oxidized in flowing air (2.0 inches wc, 34 scfh) at 700° F. for 20 minutes.

Figure 10:
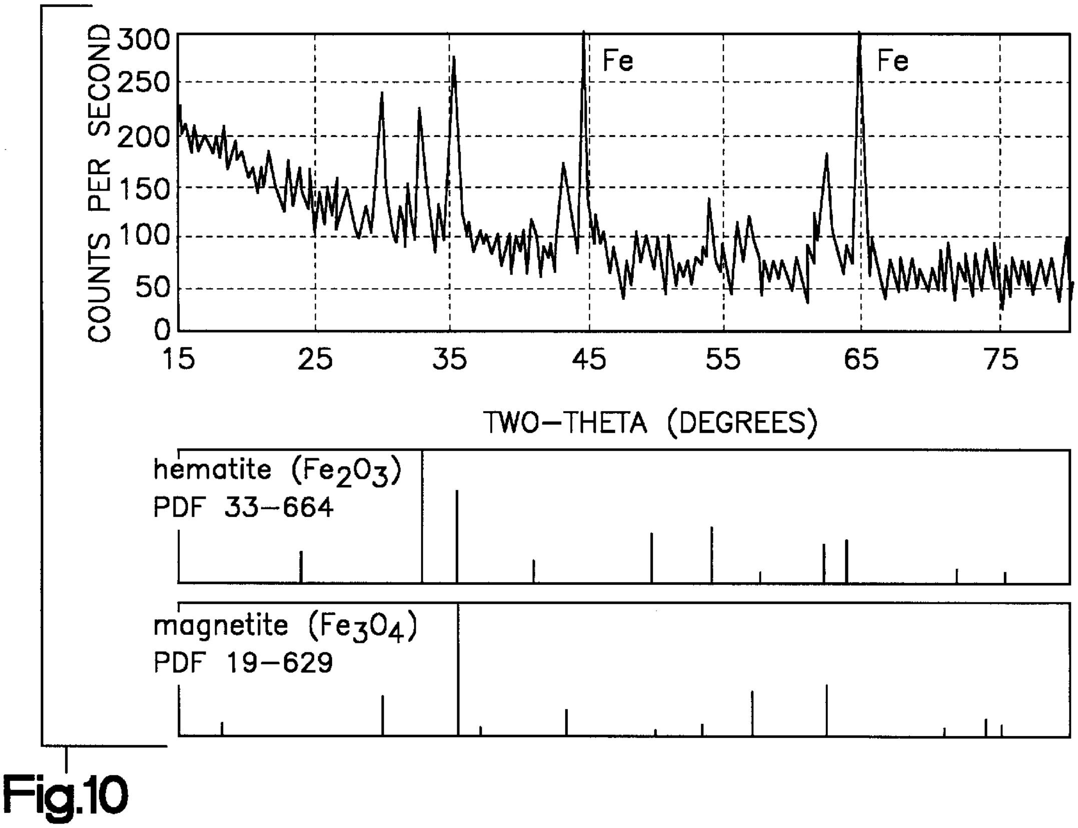
FIG. 10 is an X-ray diffraction pattern for electrical steel laminations having a layer of predominantly magnetite formed thereon by exposure to an oxidation temperature below the range of the present invention, along with a corresponding PDR card.

As shown by the resulting XRD pattern of FIG. 10, some hematite has formed, but magnetite was the dominant oxide phase. The overall signal strength was stronger than in Comparative Example 1, which indicates a slightly thicker oxide layer was formed here. However, the insulating ability of this oxide layer was quite low (about 0.933 F-amps).

The following describes how the actual surface resisitivity value of 0.933 F-amps was calculated. Since the Type 2 ULC laminations had a rough surface which alters the surface resisitivity measurement, their F-amp value was determined according to the relationship shown in FIG. 2. The rough Type 2 ULC laminations of this comparative example had a measured surface resisitivity of 0.977 F-amps. According to FIG. 2, at a test head pressure of 50 psi, rough laminations had a measured surface resistivity that was about 4.5 percent greater than the measured surface resistivity of smooth laminations having different compositions, which were subjected to the same process conditions. In the range of alloys studied, there was no compositional sensitivity to hematite layer formation. The hematite layer that was formed on the Type 2 ULC rough laminations in this comparative example should exhibit the relationship shown in FIG. 2. Thus, the "actual" smooth surface resisitivity of the rough Type 2 ULC laminations of this comparative example should be about 0.933 F-amps, which is 4.5% less than the measured surface resistivity of 0.977 F-amps.

A more precise way to determine the "actual" surface resistivity of rough laminations than the technique described in this comparative example, is to prepare laminations of the same composition and size as the rough laminations, to subject them to the same process conditions for forming the oxide layer with the exception of forming a smooth surface on the strip with a transfer surface roughness of about 10 microinches (Ra), and then to measure the surface resistivity of the smooth laminations. The measured F-amp value of the smooth laminations represents the "actual" surface resisitivity of the rough laminations, taking into account the effect that rough surfaces have on the surface resistivity measurement.

COMPARATIVE EXAMPLE 3

An experiment was carried out to determine the feasibility of converting steel laminations having a magnetite layer formed thereon such as by steam bluing, to a resistive hematite layer. The samples of Example 1 were soaked in the 18% (by volume) HNX atmosphere for 10 minutes at 1450° F. and a dew point of −20° F. The samples were then cooled and held at 950° F. in flowing steam at a flow rate of 34 scfh and 2.0 inches wc for 25 minutes and then cooled to room temperature. The samples had mostly magnetite on the surface at this point. The samples were then reheated to 950° F. in air and held for about 20 minutes, cooled to room temperature and then reheated again and held for an additional two hours.

Figure 11:
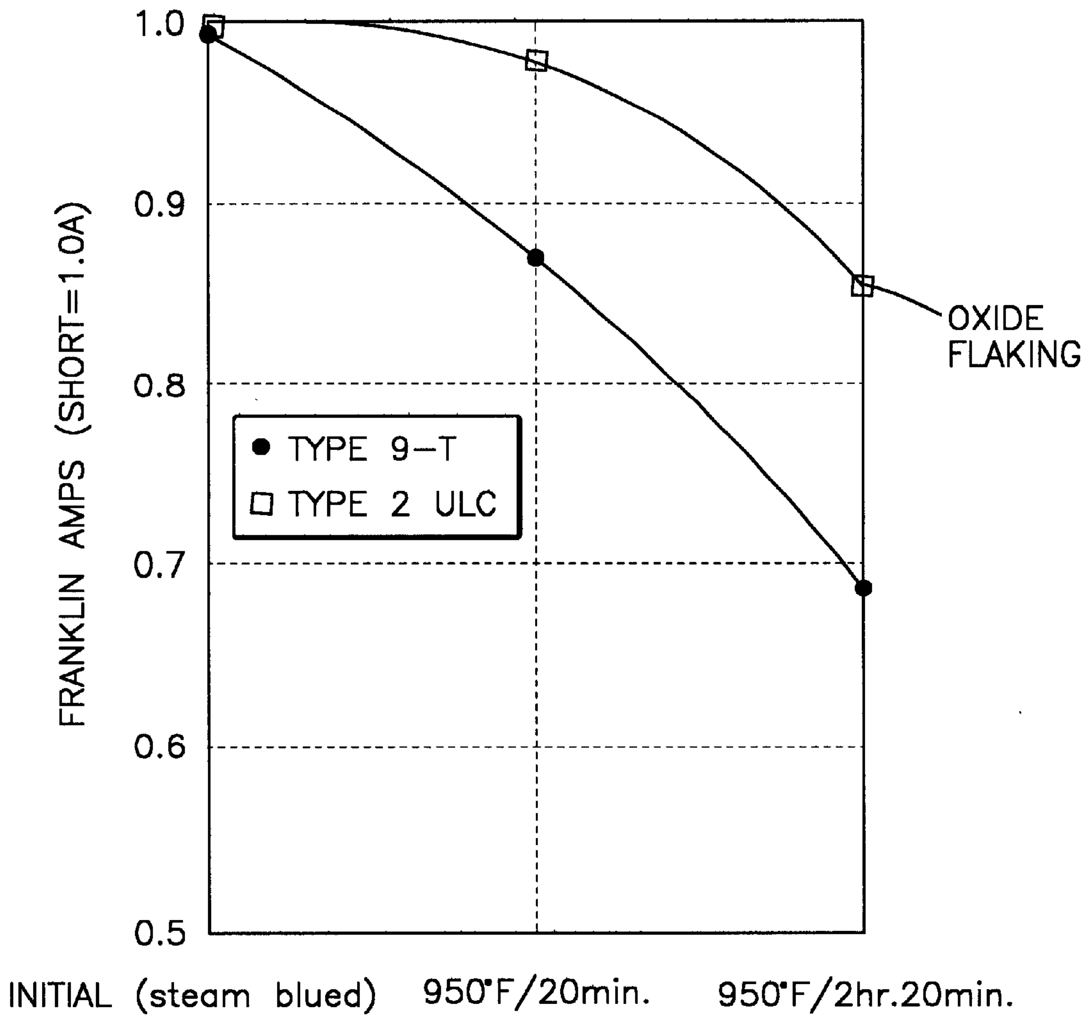
FIG. 11 is a graph of surface resistivity of electrical steel laminations, which had a magnetite layer formed thereon by exposure to steam and were then reheated in an oxidation atmosphere to convert magnetite to hematite.

The results of this experiment are shown in FIG. 11. Although magnetite converted to hematite, the conversion was slow. In addition, the surface quality of the oxide layer degraded after the reheats. The oxide layer was not firmly bonded to the samples, but rather was close to a flaking condition. Therefore, the present method for forming hematite on a steel lamination is considered superior to a method of converting a magnetite layer on a steel lamination to a hematite layer.

Many modifications and variations of the invention will be apparent to those skilled in the art from the foregoing detailed description. Therefore, it is to be understood that, within the scope of the appended claims, the invention can be practiced otherwise than as specifically disclosed.

What is claimed is:

1. A method of forming an electrically insulating layer on a steel article comprising the steps of:

heating said article in a protective atmosphere;

cooling said article; and exposing said article to an oxidation atmosphere and to a temperature of at least about 800° F. for a time so as to form on said article an electrically insulating layer comprising hematite effective to provide said article with a surface resistivity characterized by an F-amp value not greater than about 0.85 at a test pressure of 50 psi and a test transfer surface roughness of about 10 microinches (Ra).

2. The method of claim 1 wherein said protective atmosphere prevents reactions of the steel other than those involving carbon.

3. The method of claim 1 wherein said protective atmosphere comprises HNX gas.

4. The method of claim 1 wherein said protective atmosphere comprises DX gas.

5. The method of claim 1 comprising exposing said article to said oxidation atmosphere and said temperature for at least about 2 minutes.

6. The method of claim 1 comprising exposing said article to said oxidation atmosphere and said temperature for at least about 20 minutes.

7. The method of claim 1 wherein said temperature is at least about 950° F.

8. The method of claim 1 wherein a dew point of said protective atmosphere is not greater than 40° F. and said protective atmosphere comprises HNX gas.

9. The method of claim 1 wherein said oxidation atmosphere is pressurized so as to establish flow thereof.

10. The method of claim 1 comprising applying said protective atmosphere to said article in a first chamber and then applying said oxidation atmosphere to said article in a second chamber.

11. The method of claim 1 comprising applying said protective atmosphere to said article in a chamber, replacing said protective atmosphere in said chamber with said oxidation atmosphere, and subjecting said article to said oxidation atmosphere in said chamber.

12. The method of claim 1 comprising forming said resistive layer effective to provide said article with a surface resistivity characterized by a F-amp value of not greater than 0.40.

13. The method of claim 1 wherein said article has an electrical steel composition.

14. The method of claim 1 wherein said article comprises a stack of electrical steel laminations, at least one of said laminations having said surface resistivity.

15. The method of claim 1 wherein said article comprises an electrical steel lamination.

16. The method of claim 1 wherein said article comprises an antistick coating, said hematite layer being formed on said coating.

17. The method of claim 1 wherein said steel article has a composition comprising (% by weight): up to 0.04 C, 0.20–2.25 Si, 0.10–0.60 Al, 0.10–1.25 Mn, up to 0.02 S, up to about 0.01 N, up to 0.07 Sb, up to 0.12 Sn, up to 0.1 P, and the balance being substantially iron.

18. The method of claim 3 comprising decarburizing said article with said HNX gas.

19. The method of claim 1 wherein a dew point of said protective atmosphere is at least 50° F.

20. A steel article made according to the method of claim 1.

21. A method of treating steel comprising exposing a steel article to an oxidation atmosphere, and to a temperature for a time so as to form on said article an electrically insulating layer comprising hematite effective to provide said article with a surface resistivity characterized by an F-amp value not greater than about 0.85 at a test pressure of 50 psi and a test transfer surface roughness of about 10 microinches (Ra).

22. The method of claim 21 wherein said article comprises a stack of electrical steel laminations, at least one of said laminations having said surface resistivity.

23. The method of claim 21 wherein said article comprises an electrical steel lamination.

24. The method of claim 21 wherein said temperature is at least about 800° F.

25. A steel article comprising an electrically insulating oxide layer formed thereon that is firmly bonded to said article so as to avoid flaking, wherein said oxide layer comprises hematite effective to provide said article with a surface resistivity characterized by an F-amp value not greater than about 0.85 at a test pressure of 50 psi and a test transfer surface roughness of about 10 microinches (Ra).

26. The steel article of claim 25 wherein said surface resistivity is characterized by an F-amp value of not greater than 0.40.

27. The steel article of claim 25 having a composition comprising (% by weight): up to 0.04 C, 0.20–2.25 Si, 0.10–0.60 Al, 0.10–1.25 Mn, up to 0.02 S, up to about 0.01 N, up to 0.07 Sb, up to 0.12 Sn, up to 0.1 P, and the balance being substantially iron.

28. The steel article of claim 25 wherein said article comprises a stack of electrical steel laminations, at least one of said laminations having said surface resistivity.

29. The steel article of claim 25 wherein said article comprises an electrical steel lamination.

30. The steel article of claim 25 wherein said steel article comprises an antistick coating under said oxide layer.

* * * * *